(12) United States Patent
Foster et al.

(10) Patent No.: US 7,724,707 B2
(45) Date of Patent: May 25, 2010

(54) NETWORK FOR A CELLULAR COMMUNICATION SYSTEM AND A METHOD OF OPERATION THEREFOR

(75) Inventors: Gerard T. Foster, Swindon (GB); Subramanian S. Iyer, Vernon Hills, IL (US); Brian J. Moore, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 576 days.

(21) Appl. No.: 11/768,215

(22) Filed: Jun. 26, 2007

(65) Prior Publication Data

US 2009/0003263 A1 Jan. 1, 2009

(51) Int. Cl.
*H04W 4/00* (2009.01)
*H04W 36/00* (2009.01)

(52) U.S. Cl. ............ 370/331; 370/310; 370/328; 370/338; 370/349; 455/436; 455/439; 455/432.1; 455/435.1

(58) Field of Classification Search ............ 370/310, 370/328, 338, 331, 310.2, 312, 349
See application file for complete search history.

(56) References Cited

U.S. PATENT DOCUMENTS

2003/0161287 A1 8/2003 Venkitaraman et al.
2004/0166859 A1* 8/2004 Hayashi et al. ............ 455/436
2005/0088994 A1* 4/2005 Maenpaa et al. ............ 370/331
2008/0101289 A1* 5/2008 Hirano et al. ............... 370/331

FOREIGN PATENT DOCUMENTS

| EP | 0967819 A2 | 12/1999 |
| EP | 1841184 A1 | 10/2007 |
| GB | 2444756 A | 6/2008 |
| WO | 02102012 A2 | 12/2002 |
| WO | 2005086421 A1 | 9/2005 |

* cited by examiner

*Primary Examiner*—Huy Phan

(57) ABSTRACT

A network for a cellular communication system comprises access points (105-109) supporting cells within a region (113). Each access point (105-109) has an individual proxy address of a proxy address space which is a local address space of an address proxy (101) and a common network address of a network address space which is a network wide address space. A gateway access point (103) covers an entry point to the region (113) and detects a remote station entering the region. It then determines an access point (105) in the region to which the remote station is handed over and transmits a binding message to the address proxy (101) with an indication of the access point (105). In response to receiving the binding message, the address proxy (101) establishes a binding between the common network address and the proxy address of the access point (105). Data for the remote station is then forwarded to the access point (105) using the binding.

19 Claims, 6 Drawing Sheets

100

NETWORK FOR A CELLULAR COMMUNICATION SYSTEM AND A METHOD OF OPERATION THEREFOR

FIELD OF THE INVENTION

The invention relates to a network for a cellular communication system and a method of operation therefor. The cellular communication system may in particular, but not necessarily, be a Universal Mobile Telecommunication System (UMTS).

BACKGROUND OF THE INVENTION

A method which has been used to increase the capacity of cellular communication systems is the concept of hierarchical cells wherein a macrocell layer is underlayed by a layer of typically smaller cells having coverage areas within the coverage area of the macrocell. In this way, smaller cells, known as microcells or picocells (or even femtocells), are located within larger macrocells. The microcells and picocells have much smaller coverage thereby allowing a much closer reuse of resources. Frequently, the macrocells are used to provide coverage over a large area, and microcells and picocells are used to provide additional capacity in e.g. densely populated areas and hotspots. Furthermore, picocells can also be used to provide coverage in specific locations such as within a residential home or office.

The current trend is towards introducing a large number of small picocells to 3G systems. For example, it is envisaged that residential access points may be deployed having only a target coverage area of a single residential dwelling or house. As another example, it has been proposed to cover e.g. office buildings in a number of small picocells with a range of a few tens of meters. Such systems may specifically be marketed as enterprise systems allowing a given enterprise, such as a company or building administrator, to provide communication services with a high capacity, high flexibility and low cost.

However, underlaying a macrolayer of a $3^{rd}$ Generation cellular network with a picocell (or microcell) layer raises several issues. For example, the introduction of a large number of underlay cells creates a number of issues related to the identification of individual underlay cells when e.g. handing over to an underlay call. In particular, $3^{rd}$ Generation cellular communication systems are developed based on each cell having a relatively low number of neighbours and extending the current approach to scenarios wherein the mobile phone may need to consider large numbers of potential neighbour cells is not practical.

One problem of extending current approaches to scenarios where there are many underlaying picocells is how to uniquely and efficiently identify a picocell (or microcell). Specifically, it is not practically feasible to list every underlay cell as a potential neighbour of the macrocell as this would require very large neighbour lists. These large neighbour lists would e.g. result in the neighbour list exceeding the maximum allowable number of neighbours in the list, slow mobile station measurement performance as a large number of measurements would need to be made etc. It would furthermore require significant operations and management resource in order to configure each macrocell with a large number of neighbours. However, sharing identification codes (e.g. scrambling codes) for the pilot signals of the picocells results in a target ambiguity and prevents the mobile station uniquely identifying a potential handover target.

Also, the introduction of a large number of access points/base stations supporting underlay cells introduces a number of issues relating to routing and addressing within such a network. In particular, the current hierarchical addressing used in cellular communication systems has a very limited address space and does not allow an unlimited number of nodes to be introduced. In addition, it is important that routing and management operations retain a very high degree of security and mobile authentication which becomes increasingly difficult when needing to accommodate a large number of distributed nodes.

Specifically, in a current macrocell cellular system, the address system is defined with a balance between scope and speed of resolution for the expected architecture hierarchy. For example, in UMTS, only 4096 unique addresses are available for Radio Network Controllers (RNCs). Specifically, the Iu interface connecting the RNCs to the Core Network (CN) uses the Signalling System 7 (SS7) protocol which has 4096 addresses known as Signalling Point Codes (SPCs) available for RNCs thereby limiting the total number of unique RNC addresses to 4096. Furthermore, a UMTS system typically has a limit on base station addresses available at each RNC.

The approach of managing the address resolution in a hierarchical fashion whereby a cell or mobile station is addressed by a set of fixed scope network address levels works well when the expected hierarchy relationships are met, e.g. around 100 Cells per RNC, and no more than a few thousand RNCs per operator.

However, the approach is unsuitable for systems where the number of nodes at a given level exceeds the address scope for that level. For example, the introduction of large numbers of base stations/access points supporting very small cells means that the number of cells may exceed the address scope, and it is accordingly not possible to resolve certain addresses within the defined scope.

Furthermore, in some cases it has been proposed that individual residential or enterprise access points include at least some RNC functionality such that the individual residential access point is coupled to the network as an RNC entity with an individual RNC identity. However, as many tens of thousand residential or enterprise access points may exist in a given network, this substantially exceeds the address space available for RNCs.

Hence, an improved radio access network would be advantageous and in particular a network allowing increased flexibility, improved addressing, increased address scope, secure operation, improved handovers, improved support for large numbers of underlay cells, improved suitability for large numbers of potential handover target cells, improved suitability for underlay/overlay handovers, reduced neighbour lists, increased practicality, reduced measurement requirements and/or improved performance could be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a network for a cellular communication system, the network comprising: a plurality of access points supporting cells within a region having a number of entry points, each access point having an individual proxy address of a proxy address space and being associated with a common network address of a network address space, the proxy address space being a local address space of an address proxy and the network address space being a network wide address space; a gateway access point covering an entry point to the region, the gateway access point having a first address of the network address space and comprising: means for detecting a remote station entering the region via the entry point, means for determining a first access point of the plurality of access points as a handover access point for the remote station, the first access point having a first proxy address of the proxy address space; means for transmitting a binding message to the address proxy, the binding message comprising an indication of the first access point; the address proxy comprising: means for receiving the binding message from the gateway access point, means for establishing a first binding between the common network address and the first proxy address for the remote station in response to the binding message, forwarding means for receiving data for the remote station and forwarding the data to the first access point in response to the first binding.

The invention may provide an improved network for a cellular communication system. In particular, the system may enable or facilitate the deployment of a large number of underlay cells. The invention may allow an improved addressing and a substantially increased address space while achieving efficient routing and management. In particular, the invention may provide a practical, low complexity and/or low cost network comprising a large number of access points that exceed the available address space. The invention may e.g. allow address proxying to be performed at a convenient location and specifically as part of a Core Network. The invention may allow a low complexity address space expansion achieved by functionality having a high degree of compatibility with existing systems and interfaces.

The invention may allow a practical, reliable and/or efficient system for centrally expanding an available address space by an address proxy. This may for example allow address proxying for a plurality of regions to be concentrated and integrated e.g. in a single network element.

The access points may for example by UMTS picocell base stations. In some embodiments, the access points may comprise RNC functionality and be addressable as RNC entities. The invention may allow practical addressing of a number of RNC access points which exceeds the available RNC address space. Specifically, the RNC access points may exceed the defined RNC address space and address splitting mechanisms of UMTS Technical Specifications TS 25.413 and TS 25.331.

The access point may specifically be a base station or other equipment providing air interface communication in underlay cells of a macrocell layer. The underlay cells may e.g. be microcells, picocells and/or femtocells.

The remote station may for example be a User Equipment or a mobile communication unit, e.g. of a 3 rd generation cellular communication system such as UMTS.

The address proxy may be part of, or co-located with, a Core Network entity of a UMTS system. The address proxy may have an increased fan-out such that a single address of the network address space corresponds to a plurality of proxy addresses of the address proxy space.

The binding message may be communicated as a single message or a plurality of sub-messages. The address proxy may be remote from the gateway access point and/or the plurality of access points and may for a UMTS system specifically be coupled to these via an Iu interface. The address proxy can directly address the first access point using the first proxy address and the routing of the data to the first access point may be in response to this proxy address only. The data for the remote station may be forwarded to the first access point without requiring any processing or involvement of the gateway access point in the data flow.

Specifically, the gateway access point need not be an intermediate node for the forwarding of data from the address proxy to the first access point.

The first access point is a handover access point for the communication and may specifically be an intended handover target access point or an access point to which a handover has been completed. The term handover may include a Handover, Re-Location or Camping update in accordance with the terminology used in 3GPP standards.

The means for detecting the remote station entering the region via the entry point may be arranged to determine that entry is occurring if a remote station is detected which is not already registered as being inside the region and/or may be determined in response to an identity of a cell from which the remote station hands over.

The gateway access point may cover a plurality of entry points. Furthermore, different gateway access points may cover different entry points. The entry points may form a border of the region such that the only entry to the region is via an entry point covered by a gateway access point as described.

According to another aspect of the invention there is provided a method of operation for a network of a cellular communication system including: a plurality of access points supporting cells within a region having a number of entry points, each access point having an individual proxy address of a proxy address space and being associated with a common network address of a network address space, the proxy address space being a local address space of an address proxy and the network address space being a network wide address space; a gateway access point covering an entry point to the region, the gateway access point having a first address of the network address space; and an address proxy; wherein the method comprises: the gateway access point performing the steps of: detecting a remote station entering the region via the entry point, determining a first access point of the plurality of access points as a handover access point for the remote station, the first access point having a first proxy address of the proxy address space, transmitting a binding message to the address proxy, the binding message comprising an indication of the first access point; and the address proxy performing the steps of: receiving the binding message from the gateway access point, establishing a first binding between the common network address and the first proxy address for the remote station in response to the binding message, receiving data for the remote station, and forwarding the data to the first access point in response to the first binding.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a network for a UMTS cellular communication system and in particular to a system comprising a large number of access points supporting small underlay cells of a macrocell layer. However, it will be appreciated that the invention is not limited to this application but may be applied to many other systems.

Also the description will focus on embodiments in a circuit switched domain but it will be appreciated that the principles are equally applicable to a packet switched domain.

Figure 1:
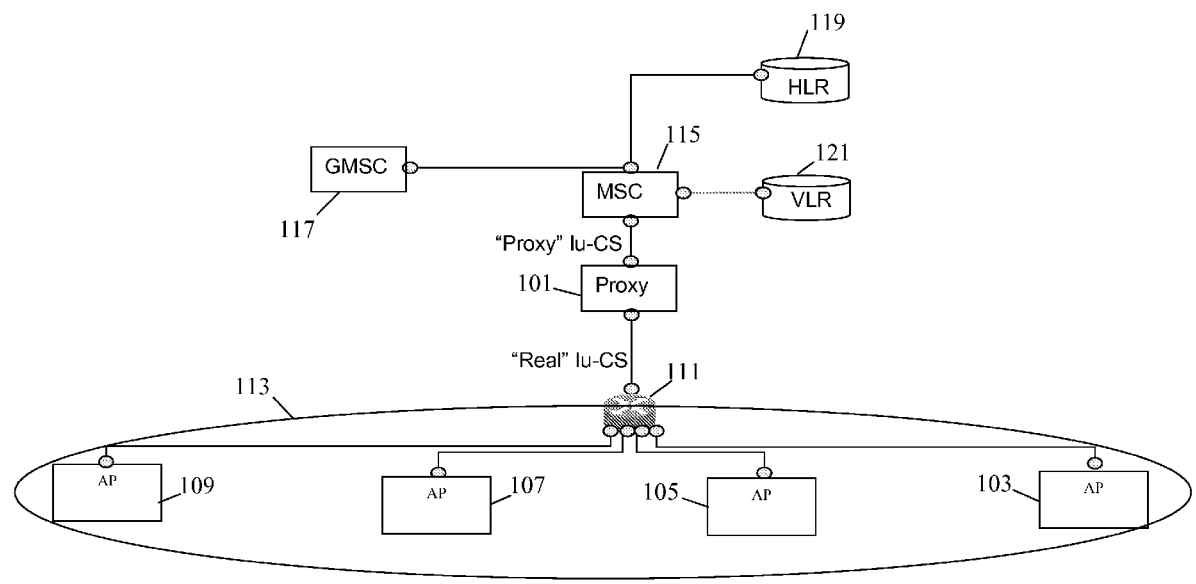
FIG. 1 illustrates an example of a network in accordance with some embodiments of the invention.

FIG. 1 illustrates an example of a network in accordance with some embodiments of the invention.

The network comprises an address proxy 101 which is coupled to a plurality of access points 103-109 via a router 111. In the example, each of the access points 103-109 comprises a UMTS picocell base station (Node B) which supports a small underlay cell of typically around 10-30 meters. Thus, each of the access points 103-109 includes a picocell base station which supports UMTS air interface communications from remote stations within a small picocell.

In the system the picocells supported by the group of access points 103-109 are all within a region 113 that has a limited number of physical entry points. For example, the region may correspond to a large office building with different picocells covering different areas and/or floors of the office building but with access to the building being limited to a few entry points. It will be appreciated that providing a large number of small picocells within a limited region allows a very high communication capacity within that region. Accordingly, efficient, flexible, advanced and high resource demanding communication services can be provided cost effectively within the region. The approach may be particularly suitable for enterprise solutions wherein e.g. improved communication services can be provided within an office building.

In the example where the region 113 corresponds to a building, the entry points are limited to the entry/exit points of the building. For clarity and brevity, the following description will focus on a scenario wherein only one entry point exists for the region e.g. corresponding to an entry via the reception of a company occupying the building.

In the example, the entry point is covered by one picocell base station which is henceforth referred to as the gateway access point 103. Thus, any remote station entering the region of the building will pass through the picocell supported by the gateway access point 103 and accordingly the gateway access point 103 will be able to detect all the remote stations entering the building.

In the specific example, the gateway access point 103 is furthermore arranged to temporarily support a remote station entering the building.

Specifically, the gateway access point 103 transmits a pilot signal which is included in the neighbour list of the macrocell covering the region/building (it will be appreciated that if the region falls within the coverage area of a plurality of macrocells, the gateway access point pilot signal may be included in the neighbour list of all of these cells). The pilot signal of the gateway access point 103 transmits the identity of the gateway access point 103 and as the remote station approaches the entry point the presence of the pilot signal from the gateway access point 103 results in a handover of the remote station from the macrocell to the gateway access point 103.

The gateway access point 103 then proceeds to initiate a handover to one of the picocells within the region. This handover may for example be unconditional such that all remote stations are handed over to a specific access point (e.g. supporting a picocell covering an area following the entry point). However, in other scenarios the handover may be in response to remote station measurements of pilot signals from the other access points.

In the system, only the pilot signal of the gateway access point 103 is included in the neighbour list of the macrocell whereas none of the pilot signals of the other cells within the region (henceforth referred to as the internal cells with the supporting access points being referred to as internal access points) are included. Thus, despite the region comprising a large number of internal cells, only a single pilot signal needs to be added to the macrocell neighbour list thereby enabling or facilitating the introduction of a large number of small picocells and in particular allowing the introduction of many underlay cells without necessitating a significant increase in the number of neighbours that must be monitored by a remote station served by the macrocell.

In the specific example, the internal access points 105-109 may use a different frequency band than the gateway access point 103 and/or the external macro cell. Thus, the underlay layer of the region can effectively be separated from the macrocell layer. In such a case, the gateway access point 103 may e.g. be arranged to unconditionally perform an interfrequency handover of the remote station to an internal access point using the underlay frequency. Hence, the gateway access point 103 may provide an efficient lead-in of remote stations from the external macrocell layer to the internal picocell layer.

The internal access points 105, 107 transmit pilot signals which are not included in the macrocell neighbour list but which are included in neighbour lists of neighbouring internal access points/cells (as mentioned some or all of the pilot signals of the internal cells may use a different frequency than the external macro cell layer). Thus, once a remote station has handed over to the picocell layer, UMTS handover detection/initialisation procedures may be used to manage mobility between the underlay cells. Thus, the approach provides an efficient separation of the picocell layer and the macrocell layer while at the same time providing an efficient handover operation between the layers.

As the only underlay pilot signal included in the macrocell neighbour list is that of the gateway access point 103, any remote station entering the building will temporarily hand over to the gateway access point 103. Thus, the gateway access point 103 has full knowledge of all remote stations entering the building.

Another problem of introducing large numbers of underlay cells to a system is that the available address space may be insufficient. For example, in UMTS the address space for Node Bs corresponds to 4096 Node B addresses for each RNC address. The RNC addresses are limited to 4096 network unique addresses thereby allowing only $4096^2 = 16,777,216$ unique addresses. Thus, the total Node B address space comprises around 17 million unique addresses with the further restriction that a maximum of 4096 addresses is available under each RNC. Although this is sufficient for many systems, it could be insufficient in systems utilising a very large number of small picocells/access points.

Furthermore, in the example of FIG. 1, each access point 103-109 not only comprises base station/node B functionality but also comprises RNC functionality supporting the access points 103-109. Specifically, each access point 103-109 comprises the RNC functionality required for supporting the corresponding picocell and thus each access point 103-109 provides an RNC interface to the network. The inclusion of RNC functionality within each access point provides the advantage of faster packet access, faster control of instantaneous radio conditions, faster handover and the option to locally breakout at the edge of a Radio Access Network to e.g. the internet without the need to route to the Core Network.

In particular, in the system of FIG. 1, each access point 103-109 interfaces to the remaining network in the same way as a conventional RNC. Specifically, each of the access points 103-109 is coupled to the network via an (extended) Iu interface and utilises data exchange protocols etc that are standardised for the Iu interface. Specifically, the access points 103-109 exchange RANAP messages with the remaining network and perform the required RNC operations in response to this message flow.

However, the address space for RNCs is limited to 4096 addresses which is insufficient to support a large number of picocells where each picocell has a separate RNC identity.

In the system of FIG. 1, this problem is addressed by the inclusion of the address proxy 101 which performs address proxying for at least some of the internal access points 105-109. In the system, each internal access point 105-109 has an individual proxy address of a proxy address space. The proxy address space is defined by the address proxy 101 and is local to the address proxy 101. Thus, the address proxy 101 uses the proxy address space to address access points 103-109 for which it performs address proxying but the addresses are not known, reserved or used by the remaining part of the network (thus the proxy address space is local to the south side of the address proxy 101 in FIG. 1). Each of the internal access points 105-109 accordingly has a unique proxy address from the proxy address space of the address proxy 101.

In addition, the internal access points 105-109 are also associated with a common network address of a network address space which is a network wide address space. Thus, the network address space is not local to the address proxy 101 but is used in the network to address the internal access points 105-109. Specifically, in the example, the network address space is an RNC address space corresponding to the network addresses available to identify an RNC.

In the network (on the north side of the address proxy 101) all internal access points 105-109 are addressed by the same common network address and the address proxy 101 resolves this address ambiguity using information from the gateway access point 103 as will be described later.

In the example of a UMTS system, the Signalling System 7 (SS7) protocol is used for addressing RNCs on the Iu interface. In particular, the Signalling Point Code (SPC) is used to address the RNCs and the network address space corresponds to the SPC address space of the MSC 115 supporting the address proxy 101. Thus, this address space is limited to the 4096 RNC identity addresses at the RANAP level which maps to an SS7 point code or an M3UA point code (Signalling Point Code) that is available (for each MSC and/or SGSN) and each address within the address space is identified by the MSC/SGSN address and an SPC. This address space is network wide and provides a single destination for any data addressed to an address within the address space.

In the system, the group of internal access points 105-109 are allocated a common SPC from this address space. The common address is linked to the address proxy 101 such that any data transmitted to the common address are routed to the address proxy 101. The address proxy 101 comprises a number of bindings between the common network address and the proxy addresses of the individual internal access points 105-109. These bindings are used to resolve the address ambiguity for the received data.

Thus, in the example, a Gateway MSC (GMSC) may receive data to be transmitted to a remote station served by one of the internal access points 105-109. This data will be addressed to the common network address for the internal access points 105-109, which is the only network address known to the network on the north side of the address proxy 101. Specifically, the GMSC first contacts the MSC 115 currently serving the remote station. The MSC 115 accesses a Home Location Register (HLR) 119 and possibly a Visitor Location Register (VLR) 121 to obtain the appropriate network address for the remote station which is the common network address/SPC. For example, in the circuit switched domain, a circuit switched connection is then setup between the GMSC 117 and the address proxy 101 using the common SPC.

The address proxy 101 accesses the current proxy bindings which bind the common network address with the local proxy address of the internal access point 105-109 that is currently serving the remote station. Thus, the address proxy 101 resolves the address ambiguity and allows the data to be routed directly to the appropriate internal access point 105-109 via the router 111. Thus, the address proxy 101 allows a large number of RNC entities to be present within the region/building without requiring a corresponding number of RNC addresses to be globally reserved in the network.

Thus, the address proxy 101 in this way acts as a proxy and just forwards Iu compliant messages between the southbound and northbound side. As will be described later, the northbound and southbound side may use different protocol stacks and the the address proxy 101 may for example provide a gateway between e.g. SCTP (Stream Control Transmission Protocol) or M3UA (Message Transfer Part level 3 User Adaptation) transmission southbound to standard M3UA and/or SS7/ATM (Asynchronous Transfer Mode) northbound towards the MSC/SGSN FIG. 1 illustrates a circuit switched architectural hierarchy of a UMTS cellular communication system and the embodiments will be described with reference thereto. However, the approach may equally apply to a packet switched domain. For example, instead of an MSC, the address proxy 101 may be coupled to an SGSN (Serving General Packet Radio Service Support Node) with RNCs being addressed using a common network address (RNC-ID) which is mapped to a plurality of access points beneath the address proxy 101.

Specifically, it will also be appreciated that for a packet switched example, similar operations to the ones described for the circuit switched example can be performed between a GGSN/HLR and an SGSN to obtain the common network address of the address proxy for an incoming message to the packet switched domain. The address proxy 101 can then use the bindings to address the appropriate access point 103-109 on the south side.

In the system, the bindings used by the address proxy 101 are managed in response to information provided by the gateway access point 103. Specifically, the system uses the concept of gateway access points covering entry points to the region to dynamically manage the address bindings in a remote address proxy 101.

Specifically, when a remote station enters the region via the gateway access point 103, the gateway access point 103 determines which of the internal access points 105-109 (or the gateway access point 103) the remote station is handed over to and it provides information to the address proxy 101 that links the remote station with the specific access point 103-109. This allows the address proxy 101 to set up a binding between the common address and the proxy address for the specific access point and to link this to the remote station. Subsequently, the address proxy 101 can directly forward data for the remote station to the appropriate access point.

Figure 2:
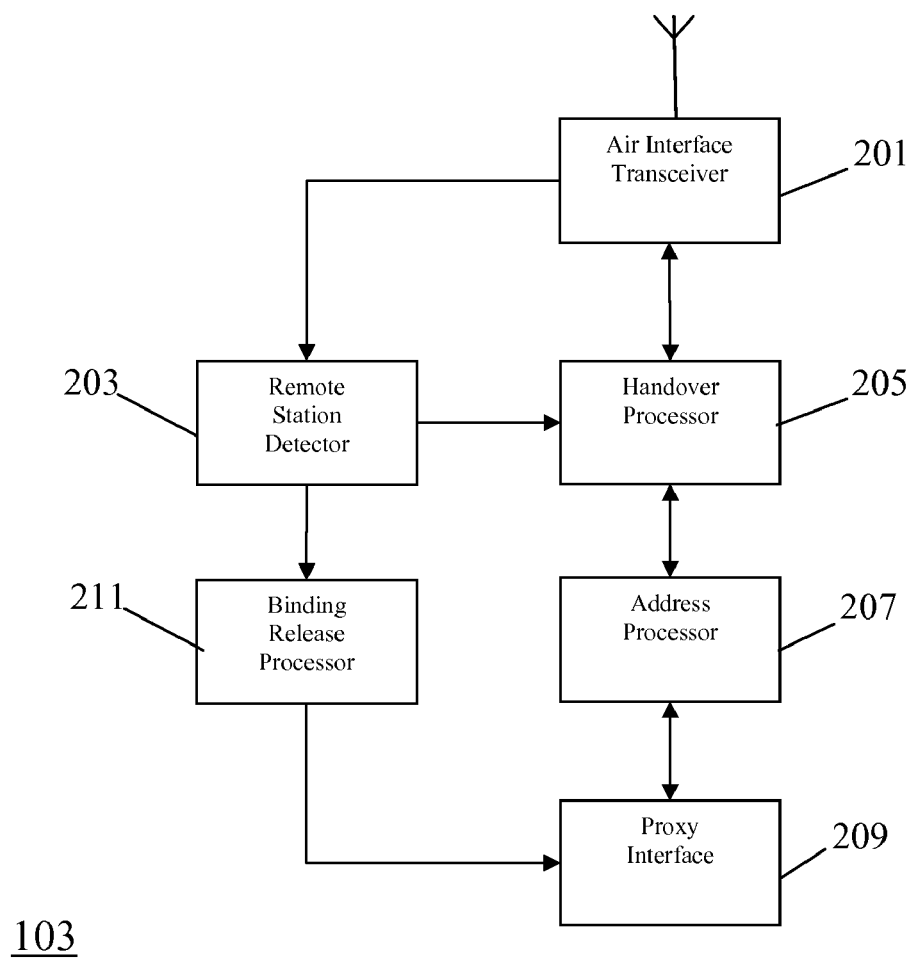
FIG. 2 illustrates an example of a gateway access point in accordance with some embodiments of the invention.
Figure 3:
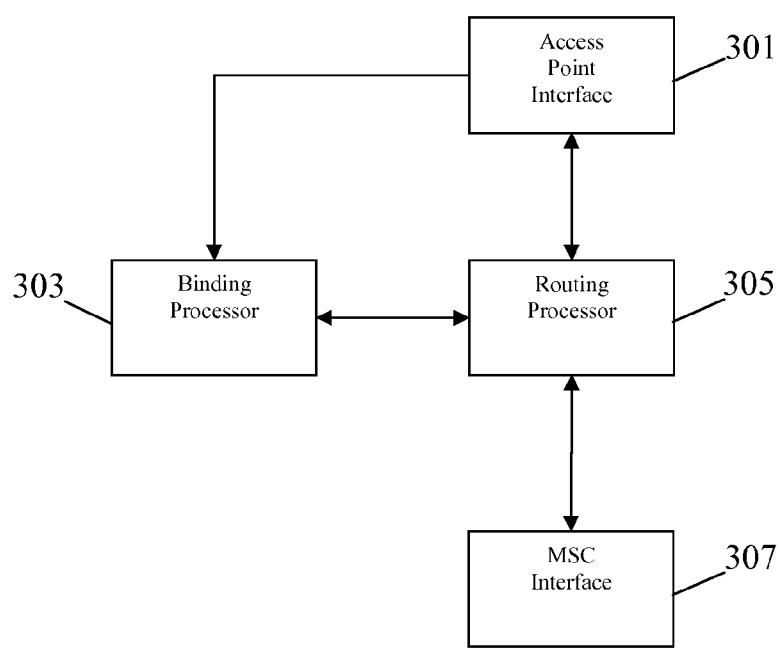
FIG. 3 illustrates an example of an address proxy in accordance with some embodiments of the invention.

The operation will be described in more detail with reference to FIGS. 2 and 3. FIG. 2 illustrates the gateway access point 103 in more detail and FIG. 3 illustrates the address proxy 101 in more detail.

The gateway access point 103 comprises an air interface transceiver 201 which is capable of communicating with remote stations over the air interface of the UMTS communication system. The air interface transceiver 201 is coupled to a remote station detector 203 which is arranged to detect that a remote station enters the region (i.e. the building in the specific example) via the entry point.

It will be appreciated that any suitable way of detecting the remote station may be used by the gateway access point 103. In the specific example, the air interface transceiver 201 transmits a pilot signal included in the neighbour list of the external macrocell. This pilot signal is detected by the remote station resulting in the initiation of a handover from the external macrocell to the entry point picocell supported by the gateway access point 103. Thus, the detection of the remote station entering the region may be by the remote station handing over to the gateway access point 103.

The remote station detector 203 is coupled to a handover processor 205 which in the specific example supports the handover of the remote station to the entry point picocell. It furthermore determines an internal cell to which the remote station should be handed over and it initiates and supports this handover using standard UMTS techniques.

In the example, the handover processor 205 selects a first access point 105 which supports the internal cell. For example, the remote station may provide measurement reports of pilot signals from the internal access points 105-109 and these may be used to select the most appropriate access point to hand over to. The gateway access point 103 furthermore informs the remote station of the access point 105 to which it should hand over. This may for example be achieved using conventional UMTS handover procedures, such as e.g. SRNS (Serving Radio Network Subsystem) Relocation with inter frequency hard handover during RRC (Radio Resource Control), Connected mode operation or reselection during RRC IDLE Mode.

In other embodiments, the selection of the appropriate internal access point 105-109 may be performed elsewhere, such as in the remote station, and the gateway access point 103 may simply determine which internal access point 105-107 has been selected, e.g. in response to signalling from the remote station.

The handover processor 205 is coupled to an address processor 207 which in the specific example proceeds to determine the proxy address (henceforth referred to as the first proxy address) and the common network address for the first access point.

The address processor 207 is coupled to a proxy interface 209 which interfaces the gateway access point 103 to the address proxy 101. In the specific example, the proxy interface 209 comprises functionality for supporting an Iu interface coupling to the address proxy 101.

The proxy interface 209 is fed the information of the first proxy address and the common network address and transmits a binding message comprising this information to the address proxy 101. In the example, the binding message furthermore comprises an identity indication which is an indication of the identity of the remote station and/or of the communication which is supported by the remote station. For example, the binding message can include an IMSI (International Mobile Subscriber Identity) identifying the remote station or can include a connection/transaction identity for the communication of the remote station.

Thus, the binding message in the specific example comprises a remote station identity indication and/or a communication identity indication which identifies the remote station and/or communication. It also comprises the common network address and unique proxy address assigned to the handover access point, i.e. to the specific internal access point (in the example the first access point 105) to which the remote station has been handed over (or will be handed over to).

Accordingly, the binding message provides the address proxy 101 with all the necessary information required to setup a binding between the common network address used and known globally in the network and the local proxy address only known and used by the address proxy 101.

It will be appreciated that in the described embodiments, the first access point 105 is identified in the binding message by the first proxy address. However, in other embodiments, other identity indications for the first access point 105 may be used. For example, the address proxy 101 may comprise a look-up table comprising predetermined access point identifiers for the internal access points 105-109 together with an assigned proxy address and common network address for each of the access points 103-109. In this case, the binding message may simply comprise the access point identifier and the address proxy 101 may determine the first proxy address and the common network address by retrieving the data stored in the look up table for the received identifier.

The address proxy 101 comprises an access point interface 301 which is arranged to interface the address proxy 101 with the access points 103-109. Specifically, the access point interface 301 comprises functionality for implementing an Iu interface coupling with the access points 103-109. The access point interface 301 receives the binding message generated by the gateway access point 103 when a remote station enters the entry point to the region.

The access point interface 301 is coupled to a binding processor 303 which is fed the binding message and which in response generates a first binding between the common network address and the first proxy address for the remote station in response to the binding message.

Specifically, the binding processor 303 comprises a binding data store wherein all bindings between network wide addresses and local proxy addresses are stored. When a binding message is received for a remote station entering the region, a binding is generated which links the appropriate common network address with the specific individual proxy address for the access point supporting the remote station. Thus, the binding is stored together with an indication of the remote station or the supported communication.

In the example, the common network address for the first access point is the same as the common network address for the gateway access point 103. Thus, when the remote station hands over from the entry cell to the internal cell, no handover is performed by the network north of the address proxy 101. Rather, the binding for the remote station in the address proxy 101 is simply changed from being between the common network address and the gateway access point 103 to being between the common network address and the first access point 105. However, it will be appreciated that in other embodiments or scenarios, the network wide addresses associated with the gateway access point 103 and the first access point 105 may be different.

The address proxy 101 furthermore comprises a routing processor 305 which is coupled to the binding processor 303 and the access point interface 301. The routing processor 305 is furthermore coupled to an MSC interface 307 which is arranged to interface with the MSC 115 serving the address proxy 101 and the access points 103-109. Specifically, the MSC interface 307 comprises functionality for implementing an Iu interface coupling with the MSC 115.

The MSC interface 307 can specifically receive data for the remote station. This data may be user data which is communicated to the remote station and/or may be control data communicated to the remote station or used by the access points 103-105 to support the remote station.

The data for the remote station is fed from the MSC interface 307 to the routing processor 305. As the network only has knowledge of the common network address of the access points 103-109, the data is addressed to the common network address. However, the routing processor 305 is arranged to retrieve the appropriate binding for the data and to use this to forward the data to the access point currently serving the remote station, i.e. to the first access point 105 in the specific example.

In particular, the data received from the MSC 115 will comprise an indication of at least one of the remote station identities and a communication identity for the supported communication. For example, the data can comprise the IMSI or connection identity and the routing processor 305 can extract this information and retrieve the corresponding binding from the binding processor 303. The routing processor 305 accordingly determines the appropriate proxy address for the first access point 105 and forwards the data to the first access point 105 using this proxy address. The data is specifically addressed to the first proxy address and transmitted to the first access point 105 as messages on the south side Iu interface of the address proxy 101.

Thus, when a remote station enters the region with a large number of underlay cells, this is automatically detected by the gateway access point 103 and used to initialise a proxy context in a remotely located address proxy 101.

In the specific example, the entry point can correspond to a reception area and will therefore typically also be an exit point from the region (i.e. the building in the specific example).

In the example, the remote station detector 203 is also capable of detecting when the remote station exits the region via the entry point. For example, the remote station may hand over to the gateway access point 103 from an internal access point 105-109 and from there handover to the external macrocell.

The remote station detector 203 is coupled to a binding release processor 211 which is further coupled to the proxy interface 209. When it is detected that a remote station exits the region, e.g. by detecting a handover sequence as referred to in the previous paragraph, the remote station detector 203 signals this to the binding release processor 211 which in response transmits a binding release message to the address proxy 101. The binding release message comprises an indication of the identity of the remote station or the supported communication.

The binding release message is received by the access point interface 301 of the address proxy 101 and fed to the binding processor 203. In response to receiving this message, the binding stored for the remote station is terminated. This termination may for example be achieved by designating the binding stored for the remote station as invalid or the binding may e.g. be deleted.

Thus, when the gateway access point 103 detects that a remote station leaves the region it transmits a message which results in the proxy function for this remote station being terminated at the remotely located address proxy 101.

Thus, the system utilises the fact that gateway access points covering entry points to a region can provide information that allows a proxy context for the cells within the region to be dynamically established and deleted. This provides a highly efficient and low complexity system that expands the effective address space and allows large number of access points and/or RNC entities.

Furthermore, in the example of FIG. 1, the binding stored for a remote station may be dynamically updated as the remote station moves between access points 103-109 within the region.

For example, when entering the region, the remote station may initially be handed over to the first access point 105. The remote station may then move within the region and e.g. enter the picocell served by a second access point 107. It may then be handed over from the first access point 105 to the second access point 107.

In the example, one or both of the first access point 105 and the second access point 107 can in response to the handover transmit a binding update message which comprises an indication of the second access point 107. In the specific example, the binding update message comprises the proxy address of the second access point 107.

The binding update message is received by the address proxy 101 and fed to the binding processor 203. In response, the binding processor 203 sets up a second binding between the common network address and a second proxy address being the proxy address of the second access point 107.

In some embodiments/scenarios, the address proxy 101 may continue to maintain both the initial binding as well as the second binding. For example, in some systems such multiple bindings may be temporarily maintained in order to facilitate or enable a soft handover for the remote station.

However, in the described embodiment, the address proxy 101 deletes the first binding when an indication of a handover completion is received for the remote station. In some embodiments, the binding update message may be interpreted as a handover completion indication resulting in the second binding being generated simultaneously with the first binding being deleted. It will be appreciated that this is equivalent to the first binding being updated to reflect that the remote station has moved to the second access point 107.

Thus, as the remote station moves within the region, the binding context of the address proxy 101 is dynamically updated to reflect the current location.

In the system of FIG. 1, the address proxy 101 is a network functionality which is located in the UMTS core network and which is common for a plurality of regions (not shown). Thus, the address proxy 101 is a centralised address proxy that can perform address proxying for a plurality of regions using small underlay cells supported by access points with RNC functionality. Thus, the system provides a reduced cost and complexity of deployment as the address proxying can be achieved by introducing a central address proxy supported by suitable gateway access points. However, each of the gateway access points can maintain a low complexity. The centralisation of the address proxy can thus reduce overall cost and facilitate management and deployment.

The address proxy 101 may be implemented as part of the core network rather than of the Radio Access Network (RAN) element of the UMTS system. Specifically, the address proxy 101 may be located at a suitable location relative to other core network elements. For example, it may be co-located with the serving MSC 115. Thus, the described approach provides significant freedom and flexibility in locating the address proxy 101. This may be of particular advantage when an address proxy 101 supports address proxying for a plurality of regions.

The system may also provide a more efficient routing of data to the appropriate access point 103-109 and in particular it does not require that all data is communicated to a specific RNC as would be the case if address proxying was performed at the RNC level. For example, in the system of FIG. 1, data for a remote station served by the second access point 107 can be directly routed to the second access point 107 via the router 113 and without the gateway access point 103 having any involvement in the data flow from the address proxy 101 to the second access point 107.

In the example, the address proxy 101 uses an Iu interface on both the northbound and the southbound side thereby allowing other network equipment (such as the access points 103-109, the router 113 and the MSC 115) to use standardised Iu interface functionality. However, in the specific example, the protocol stacks used by the north side and the south side are not identical.

Figure 4:
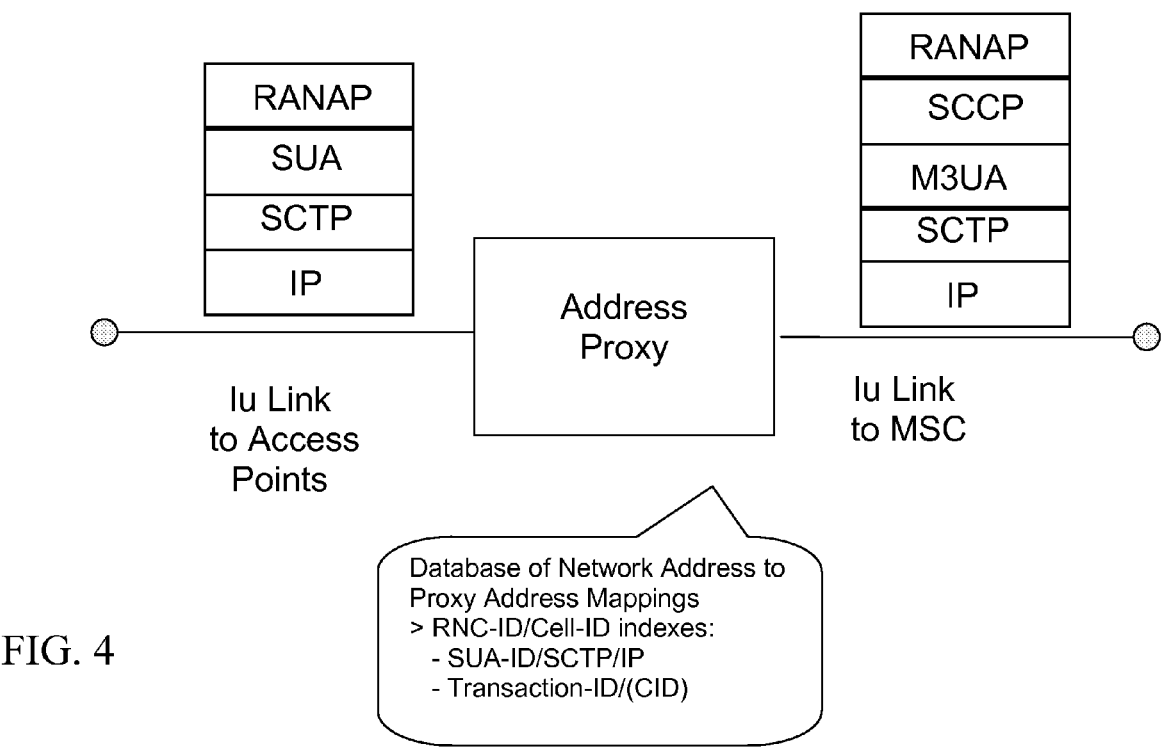
FIG. 4 illustrates an example of data protocol stacks used with an address proxy in accordance with some embodiments of the invention.

FIG. 4 illustrates an example where the north side Iu link to the MSC 115 uses a Message Transfer Part level 3 User Adaptation (M3UA) layer. Thus, the common network address used to address any of the access points 103-109 on the north side network is an M3UA address. Specifically, it is an SS7 SPC selected from the SS7 SPC address space of the MSC 115.

However, the south side Iu interface to the access points 103-109 does not use an M3UA layer but instead uses a Signalling Connection Control Part User Adaptation (SUA) layer (it will be appreciated that in other embodiments it may e.g. be another M3UA stack). Accordingly, the proxy address used to address individual access points is an SUA address.

Thus, in the example, the address proxy 101 performs a gateway function between the SUA/SCTP/IP link from the address proxy 101 to the access points 103-109 and the M3UA/SCTP/IP link from the address proxy 101 to the MSC 115. Therefore, the stored bindings may relate an M3UA network address to an SUA proxy address.

It will be appreciated that although the description has considered only a single gateway access point, the region may be covered by a plurality of gateway access points each of which may comprise similar or identical functionality to that described for the gateway access point 103.

In some embodiments, all entry points to the region may be covered by a gateway access point. For example, a building may have several entry points with each entry point being covered by a gateway access point.

In some embodiments only some entry points are covered by a gateway access point. Thus, in such embodiments a remote station may potentially enter the region without being detected. However, as the remote station does not perform a handover to the gateway access point unless it can receive the pilot signal, the remote station does not handover to the picocell layer but continues to be supported by the macrocell. This may for example be acceptable in a building wherein a secondary entrance is only infrequently used and where the external macrocell provides coverage within the building.

It will be appreciated that in some embodiments, the pilot signal transmitted by the gateway access point 103 may use the same frequency as a pilot signal transmitted by the neighbour macrocell. For a Code Division Multiple Access (CDMA) system such as UMTS this substantially facilitates remote station measurements. However, at least some of the internal cells do not transmit pilot signals using this frequency. Specifically, the gateway access point 103 may use the same frequency as the external macrocell whereas all other cells use a different frequency. This may allow an efficient separation of the macrocell layer and the underlay layer of the region while at the same time allowing an efficient interoperation and handover between the layers.

Figure 5:
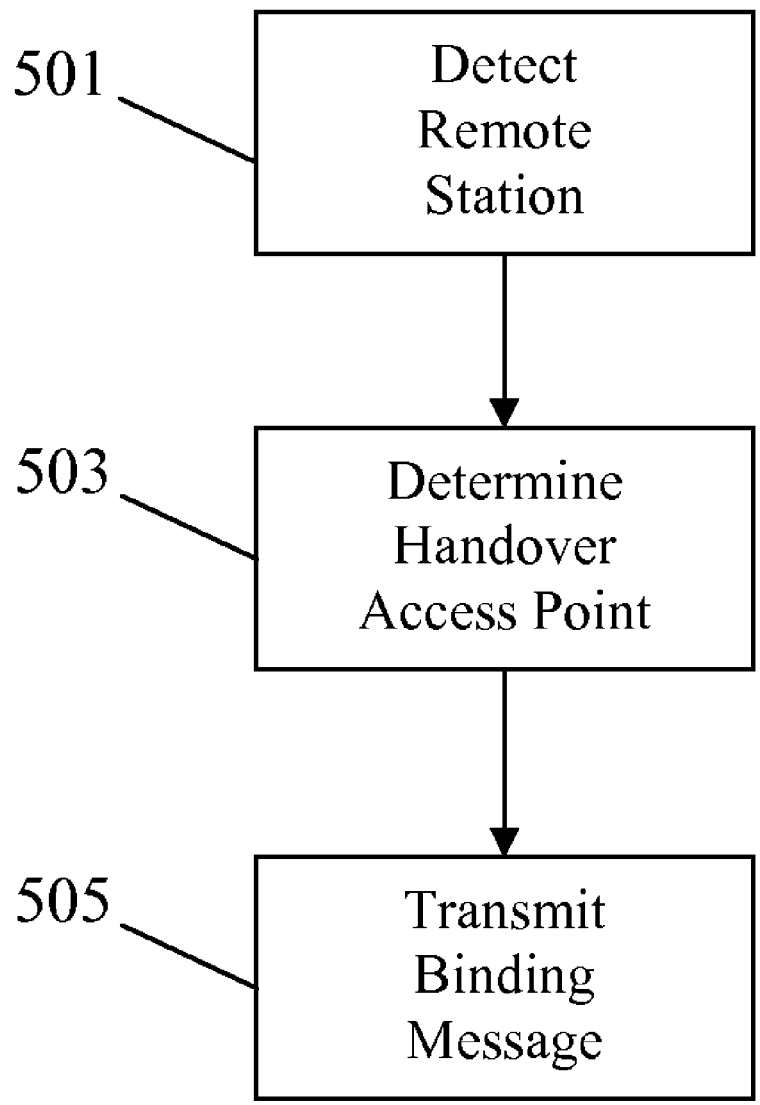
FIG. 5 illustrates an example of a method of operation for a gateway access point in accordance with some embodiments of the invention.
Figure 6:
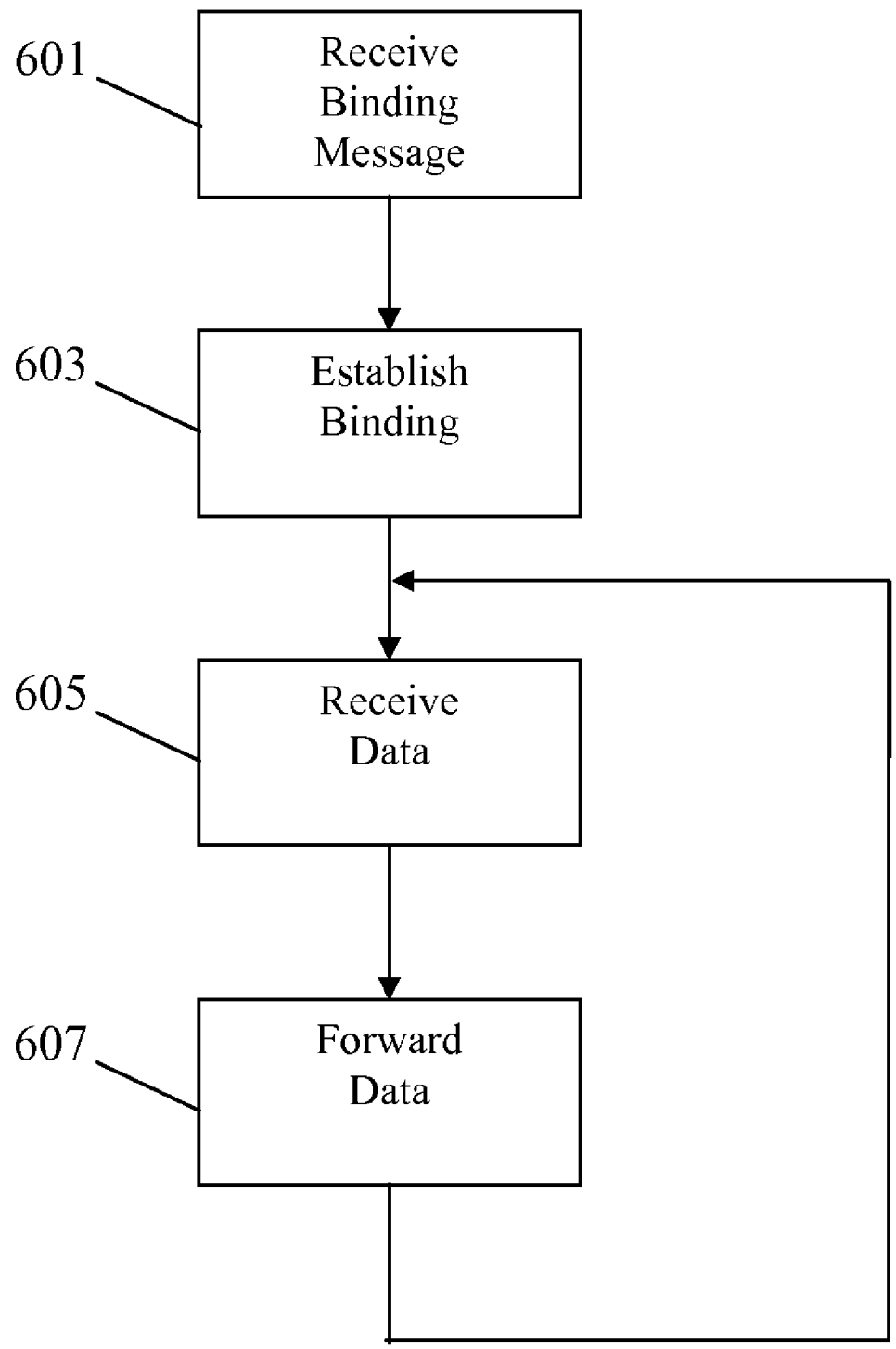
FIG. 6 illustrates an example of a method of operation for an address proxy in accordance with some embodiments of the invention.

FIGS. 5 and 6 illustrate a method of operation for a network of a cellular communication system which includes:

A plurality of access points supporting cells within a region having a number of entry points. Each access point has an individual proxy address of a proxy address space and is associated with a common network address of a network address space. The proxy address space is a local address space of an address proxy and the network address space is a network wide address space.

A gateway access point covering an entry point to the region, the gateway access point having a first address of the network address space.

An address proxy.

FIG. 5 illustrates a method of operation for the gateway access point.

The method starts in step 501 wherein a remote station entering the region via the entry point is detected.

Step 501 is followed by step 503 wherein a first access point of the plurality of access points is determined as a handover access point for the remote station. The first access point has a first proxy address of the proxy address space.

Step 503 is followed by step 505 wherein a binding message is transmitted to the address proxy. The binding message comprises an indication of the first access point.

FIG. 6 illustrates a method of operation for the gateway access point.

The method starts in step 601 wherein the binding message is received from the gateway access point.

Step 601 is followed by step 603 wherein a first binding is established between the common network address and the first proxy address for the remote station in response to the binding message.

Step 603 is followed by step 605 wherein data is received for the remote station.

Step 605 is followed by step 607 wherein the data is forwarded to the first access point in response to the first binding.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A network for a cellular communication system, the network comprising:
   a plurality of access points supporting cells within a region having a number of entry points, each access point having an individual proxy address of a proxy address space and being associated with a common network address of a network address space, the proxy address space being a local address space of an address proxy and the network address space being a network wide address space;
   a gateway access point covering an entry point to the region, the gateway access point having a first address of the network address space and comprising:
      means for detecting a remote station entering the region via the entry point,
      means for determining a first access point of the plurality of access points as a handover access point for the remote station, the first access point having a first proxy address of the proxy address space;
      means for transmitting a binding message to the address proxy, the binding message comprising an indication of the first access point;
   the address proxy comprising:
      means for receiving the binding message from the gateway access point,
      means for establishing a first binding between the common network address and the first proxy address for the remote station in response to the binding message,
      forwarding means for receiving data for the remote station and forwarding the data to the first access point in response to the first binding.

2. The communication network of claim 1 wherein the common network address is identical to the first network address.

3. The communication network of claim 1 wherein
   at least one of the first access point and a second access point of the plurality of access points comprises means for transmitting a binding update message to the address proxy in response to a handover of the remote station from the first access point to the second access point, the binding update comprising at least an indication of the second access point; and
   the address proxy is arranged to:
      establish a second binding between the common network address and the second proxy address for the remote station in response to the binding update message, and
      forward data for the remote station to the second access point in response to the second binding.

4. The communication network of claim 3 wherein the address proxy is arranged to delete the first binding in response to receiving an indication of a handover completion for the remote station.

5. The communication network of claim 1 wherein the gateway access point comprises:
   means for detecting the remote station exiting the region via the entry point,
   means for transmitting a binding release message to the address proxy; and
the address proxy comprises:
   means for receiving the binding release message from the gateway access point, and
   means for terminating the first binding in response to the binding release message.

6. The communication network of claim 1 wherein the gateway access point comprises:
   means for selecting the first access point from the plurality of access points; and
   means for transmitting an indication of the first access point to the remote station.

7. The communication network of claim 1 wherein the gateway access point is arranged to support a handover of the remote station from a cell external to the region to a cell supported by the first access point by supporting a temporary handover of the remote station from the cell external to the region to the gateway access point followed by a handover from the gateway access point to the first access point.

8. The communication network of claim 1 wherein the gateway access point and the plurality of access points support underlay cells of a macrocell layer.

9. The communication network of claim 1 wherein the gateway access point is arranged to transmit a first pilot signal using a same frequency as for a second pilot signal of a neighbour macrocell; and wherein the first access point is arranged to not transmit any pilot signal using the same frequency.

10. The communication network of claim 1 wherein the gateway access point is arranged to transmit a first pilot signal which is included in a neighbour list of a macro-cell covering at least the entry point.

11. The communication network of claim 1 wherein the indication of the first access point in the binding message is an indication of the first proxy address.

12. The communication network of claim 1 wherein the binding message comprises a first identity indication and the access proxy is arranged to associate the binding with the first indication and to select the first binding for forwarding data to the remote station from a plurality of bindings in response to the first indication and a second identity indication associated with the data for the remote station; wherein the identity indication is at least one of a remote station identity indication and a communication identity indication for a communication supported by the remote station.

13. The communication network of claim 1 wherein the network address space is a radio network controller address space.

14. The communication network of claim 1 wherein the network address space is a Signalling Point Code address space of a Signalling System 7 protocol.

15. The communication network of claim 1 wherein the network is a Universal Mobile Telecommunication System, UMTS, network.

16. The communication network of claim 15 wherein the address proxy is comprised in a core network of the UMTS network.

17. The communication network of claim 15 wherein the first binding associates a Message Transfer Part level 3 User Adaptation, M3UA, common network address and a Signalling Connection Control Part User Adaptation, SUA, proxy address.

18. The communication network of claim 15 wherein the plurality of access points are coupled to the address proxy via an Iu interface and the first proxy address is an Iu Radio Network Controller address for the first target point.

19. A method of operation for a network of a cellular communication system including:
   a plurality of access points supporting cells within a region having a number of entry points, each access point having an individual proxy address of a proxy address space and being associated with a common network address of a network address space, the proxy address space being a local address space of an address proxy and the network address space being a network wide address space;
   a gateway access point covering an entry point to the region, the gateway access point having a first address of the network address space; and
   an address proxy;
wherein the method comprises:
   the gateway access point performing the steps of:
      detecting a remote station entering the region via the entry point,
      determining a first access point of the plurality of access points as a handover access point for the remote station, the first access point having a first proxy address of the proxy address space,
      transmitting a binding message to the address proxy, the binding message comprising an indication of the first access point; and
   the address proxy performing the steps of:
      receiving the binding message from the gateway access point,
      establishing a first binding between the common network address and the first proxy address for the remote station in response to the binding message,
      receiving data for the remote station, and
      forwarding the data to the first access point in response to the first binding.

* * * * *